(12) United States Patent
Taruishi et al.

(10) Patent No.: US 6,572,973 B1
(45) Date of Patent: Jun. 3, 2003

(54) LOW REFLECTION MEMBER

(75) Inventors: Tomohiro Taruishi, Shizuoka (JP); Kensaku Higashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/695,044

(22) Filed: Oct. 25, 2000

(30) Foreign Application Priority Data

Oct. 29, 1999 (JP) .............................. 11-310343
Oct. 3, 2000 (JP) ....................... 2000-303995

(51) Int. Cl.[7] ................................ B32B 9/04
(52) U.S. Cl. ................... 428/447; 428/428; 428/429
(58) Field of Search ................. 428/447, 448, 428/428, 429

(56) References Cited

U.S. PATENT DOCUMENTS 6,129,980 A * 10/2000 Tsukada et al. ............. 428/327

FOREIGN PATENT DOCUMENTS

| JP | 2-19801 | 1/1990 |
|---|---|---|
| JP | 6-230201 | 8/1994 |
| JP | 7-331115 | 12/1995 |
| JP | 8-211202 | 8/1996 |
| JP | 9-24575 | 1/1997 |

* cited by examiner

Primary Examiner—Robert Dawson
Assistant Examiner—Michael J Feely
(74) Attorney, Agent, or Firm—Nixon & Vanderhye P.C.

(57) ABSTRACT

The present invention relates to a low reflection member for use in image display devices such as a liquid crystal display (LCD), a plasma display (PDP), a CRT, and an El. The low reflection member includes a transparent substrate and a low refractive index layer having a refractive index lower than that of the substrate. The low refractive index layer comprises a cured product of a mixture containing a hydrolyzable silane compound and/or hydrolyzed product thereof, and a cure-promoting component selected from phosphoric acids, sulfonic acids, and silicon dioxide flux. The low reflection member has a refractive index low enough to exhibit an anti-reflection effect, is fabricated at relatively low temperatures by solvent coating using common solvents, and has high adhesion and anti-scratching property.

17 Claims, 1 Drawing Sheet

LOW REFLECTION MEMBER

BACKGROUND OF THE INVENTION

1. Field of the Invention

The present invention relates to a low reflection member excellent in preventing the reflection of external light for use in image display devices such as a liquid crystal display (LCD), plasma display (PDP), cathode ray tube (CRT), and Electroluminescence device (EL).

This application is based on patent applications filed in Japan (Japanese Patent Applications Nos. Hei 11-310343 and 2000-303995), whose contents are incorporated herein by reference.

2. Description of the Related Art

Various image displays are provided with a low reflection member in order to prevent the reflection of external light.

It has been known that formation on an outermost layer of a transparent substrate made of a film or glass of a low refractive index layer made of a material having a lower refractive index than that of the substrate to an optical thickness of ¼ of the visible light wavelength will decrease the reflectance resulting composite due to interference.

The structure of low reflection member includes one in which only a low refractive index layer in a single layer is provided on at least one side of the substrate and another in which a high refractive index layer and a low refractive index layer are laminated in order on at least one side of the substrate to make a multi-layer structure. The refractive index and film thickness of each layer for exhibiting a good anti-reflection function can be calculated using a known equation. According to Yoshida, S. and Yajima, H., "Thin films/Optical devices", Tokyo University Publishing, the conditions under which the incident light that enters a low refractive index layer perpendicularly is not reflected and transmits at an intensity of 100% must satisfy the following equations.

$$n_1^2 = n_s \quad (1)$$

$$n_1 d_1 = \lambda_0/4 \quad (2)$$

wherein $n_1$ indicates the refractive index of the low refractive index layer, $n_s$ indicates the refractive index of the substrate or the high refractive index layer, $d_1$ indicates the thickness of the low refractive index layer, and $\lambda_0$ indicates the wavelength of light.

In order to fully (100%) prevent the reflection of light, the refractive index of the low refractive index layer in the equation (1) must be the square root of the refractive index of an underlying layer (substrate or high refractive index layer) and the film thickness of the low refractive index layer must be identical with a value calculated according to the equation (2) above from the refractive index of low refractive layer and the wavelength of light selected in the equation (1) above.

In the equation (1), the refractive index, $n_s$, of a typically used substrate or high refractive index layer is in the range of 1.45 to 2.10, and hence the refractive index, $n_1$, of low refractive index layer that is fit therefor will be in the range of 1.20 to 1.45. In the case, where the reflectance in the visible light region is to be made lowest in the equation (2), the film thickness, $d_1$, will be suitably about 100 nm.

Most of anti-reflection coatings are formed by film formation methods under a vacuum, such as a vacuum vapor deposition method and a sputtering method. When plastic films are selected as a substrate, the substrate has a low thermal deformation temperature so that it cannot be heated sufficiently and the resulting anti-reflection coating tends to have insufficient adhesion to the substrate. Members to which these methods can be applied are limited to those having relatively small sizes and they are disadvantageous in that they are not only unsuitable for continuous production but also require high production costs. Hitherto, spectacle lenses have been provided with anti-reflection coatings by such a vacuum film formation method.

On the other hand, recently, image displays, typically LCD, PDP, CRT and EL, (hereafter, referred to simply as "displays") are being frequently used in various fields including televisions and computers, and are being rapidly developed. The development of such displays is focused on higher precision images, higher quality images, and lower prices, and as a natural consequence, there has been an increasing demand for anti-reflection. Accordingly, attention has been paid to development of low reflection members produced by solvent coating, which enables production of large area coating and continuous production as well as production at low costs.

Naturally, the characteristics such low reflection members require include one that they have a refractive index of 1.45 or less. Besides, in order for them to be useful under the condition of use at the outermost surface of a display, it is required that they have high adhesion and high resistance to scratching. However, most of conventional low reflection members have been designed with attention being paid to only lower refractive index and are not always satisfactory with respect to their resistance to scratching.

The means for obtaining a low refractive index layer by solvent coating are roughly classified into two methods. One is a method which realizes a lower refractive index by use of a material containing fluorine and the other is a method which deposits fine particles, etc. on the surface of a film to provide pores and introduces air therethrough to achieve a lower refractive index.

Classified by the material that constitutes the low refractive index layer, they are roughly divided into three techniques, that is, a technique which cures hydrolyzable silane compounds by sol-gel reaction (JP-A-9-24575), a technique which uses fluorine-containing organic materials (JP-A-2-19801), and a technique which uses fine particles with a low refractive index. Also, as combinations of the above three, there have been proposed a technique which combines a fluorine-containing organic material with a hydrolyzable silane compound (JP-A-7-331115), a technique which combines a fluorine-containing organic material with fine powders with a low refractive index (JP-A-6-230201), a technique which combines a hydrolyzable silane compound with fine particles with a low refractive index (JP-A-8-211202), etc.

However, none of the techniques is furnished with practically sufficient anti-reflection characteristic along with anti-scratching and productivity where a plastic film is selected as a substrate.

For example, the method that uses fine particles with a low refractive index produces an increased refractive index as the ratio of the binder increases, so that a sufficient anti-reflection property cannot be obtained. On the other hand, a lesser amount of the binder results in a decrease in film strength so that the obtained low reflection member cannot be used.

In the method that uses a fluorine-containing organic material, a radical polymerization product of a fluorine-containing acrylic compound is mainly used. The radical polymerization-type compounds undergo inhibition of their polymerization by the oxygen in the air so that no sufficiently cured films can be obtained, with the result that the obtained films are deficient in hardness and their volume shrinkage at the time of curing is great so that problems of adhesion to the substrates and peeling occur therefrom.

The method that uses hydrolyzable silane compounds has problems in that it requires high temperature or a long curing time. This causes such problems as the deterioration of the substrate and that the drying step requiring a long time, which incurs high production costs.

SUMMARY OF THE INVENTION

The present invention has been made in order to solve the above problems and it is an object of the present invention to provide a low reflection member comprising a low refractive index layer that has a low refractive index sufficient for exhibiting an anti-reflection effect, is fabricated at relatively low temperatures by solvent coating using an common solvent, and has high adhesion and anti-scratching properties.

The low reflection member of the present invention comprises a transparent substrate and a low refractive index layer having a refractive index lower than that of the transparent substrate, wherein the low refractive index layer comprises a cured product of a mixture of a hydrolyzable silane compound and/or a hydrolyzed product thereof and a cure promoting component composed of at least one selected from phosphoric acids, sulfonic acids and silicon dioxide flux, the hydrolyzable silane compound being at least one selected from a silane compound represented by the following general formula [1], a silane compound represented by the general formula [2], a compound or polymer represented by the general formula [3]

$R^1_a$—$SiX_{4-a}$  $0 \leq a \leq 2$  [1]

$X_3Si$—$R^2$—$SiX_3$  [2]

Y—$(Si(OR^3)_2O)_n$—Y  [3]

(wherein X represents any one of Cl, Br, NCO and $OR^4$, Y represents H or an organic group having 1–20 carbon atoms, $R^1$, $R^2$, $R^3$ and $R^4$ represent each an organic group having 1–20 carbon atoms, and n is an integer of 1–30).

The low reflection member of the present invention allows curing to occur at low temperatures as low as about 40° C. and it can be coated on a film. Furthermore, the low reflection member of the present invention has high film strength that has never been attained by the conventional cured products of silanes as well as excellent adhesion and anti-scratching properties.

Here, preferably, the low refractive index layer is a cured product of a mixture containing 1–30 parts by weight of the cure promoting component per 100 parts by weight of the hydrolyzable silane compound and/or hydrolyzed product thereof.

Furthermore, the hydrolyzable silane compound is a mixture of a silane compound having 4 hydrolyzable groups and one or both of a silane compound represented by the general formula [4] and a silane compound represented by the general formula [5] below, thereby improving refractive index and film strength in a good balance.

$R^5_a$—$SiX_{4-a}$  $1 \leq a \leq 2$  [4]

$X_3Si$—$R^6$—$SiX_3$  [5]

(wherein X represents any one of Cl, Br, NCO and $OR^4$, $R^5$ and $R^6$ represent each an organic group having at least one fluorine atom, and $R^4$ is as defined above).

Furthermore, a high refractive index layer may be provided between the low refractive index layer and the transparent substrate.

Polarizing plates may be used as the transparent substrate.

DETAILED DESCRIPTION OF THE PREFERRED EMBODIMENTS

Figure 1:
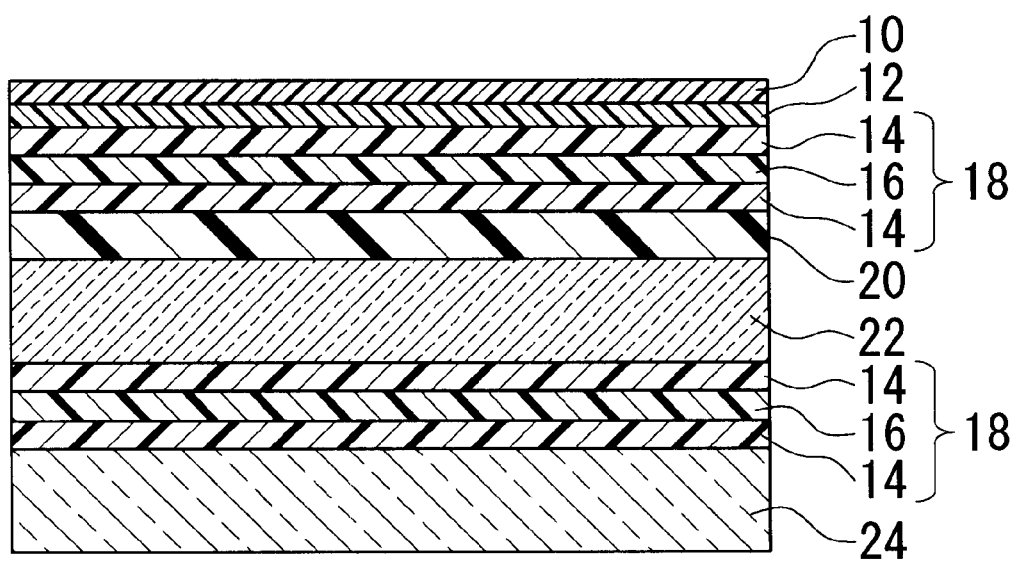
FIG. 1 is a schematic cross-sectional view showing an example of LCD.

Hereinafter, the present invention will be described in more detail.

The low refractive index layer in the low reflection member of the present invention comprises a cured product of a mixture of a hydrolyzable silane compound and/or a hydrolyzed product thereof and a cure promoting component composed of at least one selected from phosphoric acids, sulfonic acids and silicon dioxide flux.

The hydrolyzable silane compound, which is a main component of the mixture that forms an anti-reflection coating after curing, is selected from a silane compound represented by the following general formula [1], a silane compound represented by the general formula [2], a compound or polymer represented by the general formula [3]

$R^1_a$—$SiX_{4-a}$  $0 \leq a \leq 2$  [1]

$X_3Si$—$R^2$—$SiX_3$  [2]

Y—$(Si(OR^3)_2O)_n$—Y  [3]

(wherein X represents any one of Cl, Br, NCO and $OR^4$, Y represents H or an organic group having 1–20 (preferably 5–12) carbon atoms, $R^1$, $R^2$, $R^3$ and $R^4$ represent each an organic group having 1–20 (preferably 5–12) carbon atoms, and n is an integer of 1–30).

These will be hydrolyzed in common solvents or coatings in the presence of moisture to form two or more silanol groups. In particular, to improve the film strength, silane compounds whose silicon atom has 4 hydrolyzable groups (the general formula [1], wherein a=0, general formula [3], wherein n=2) are preferred. To decrease the refractive index, fluoroalkylsilane compounds (general formulae [4], [5]) are preferred. It is more preferred to use them in admixture in order to balance these properties.

$R^5_a$—$SiX_{4-a}$  $1 \leq a \leq 2$  [4]

$X_3Si$—$R^6$—$SiX_3$  [5]

(wherein X represents any one of Cl, Br, NCO and $OR^4$, $R^5$ and $R^6$ represent each an organic group having at least one fluorine atom, and $R^4$ is as defined above.)

The silane compound whose silicon atom has 4 hydrolyzable groups includes tetramethoxysilane, tetraethoxysilane, tetra(1-propoxy)silane, tetra(2-propoxy)silane, tetra(1-butoxy)silane, tetrachlorosilane, tetrabromosilane, tetraisocyanatosilane, dimethoxysiloxane oligomers, diethoxysiloxane oligomers, etc. However, it is not limited thereto.

The fluoroalkylsilane compound includes 3,3,3-trifluoropropyltrimethoxysilane, 3,3,3-trifluoropropyltriethoxysilane, 3,3,3-trifluoropropyltripropoxysilane, 3,3,3-trifluoropropyltrichlorosilane, 3,3,3-trifluoropropyltriisocyanatosilane, 1H,1H,2H,2H-tetrahydroperfluorohexyltrimethoxysilane, 1H,1H,2H,2H- tetrahydroperfluorohexyltriethoxysilane, 1H,1H,2H,2H-tetrahydroperfluorohexyltripropoxysilane, 1H,1H,2H,2H-tetrahydroperfluorohexyltrichlorosilane, 1H,1H,2H,2H-tetrahydroperfluorohexyltriisocyanatosilane, 1H,1H,2H,2H-tetrahydroperfluorononyltrimethoxysilane, 1H,1H,2H,2H-tetrahydroperfluorononyltriethoxysilane, 1H,1H,2H,2H-tetrahydroperfluorononyltripropoxysilane, 1H,1H,2H,2H-tetrahydroperfluorononyltrichlorosilane, 1H,1H,2H,2H-tetrahydroperfluorononyltriisocyanatosilane, 1H,1H,2H,2H-tetrahydroperfluorodecyltrimethoxysilane, 1H,1H,2H,2H-tetrahydroperfluorodecyltriethoxysilane, 1H,1H,2H,2H-tetrahydroperfluorodecyltripropoxysilane, 1H,1H,2H,2H-tetrahydroperfluorodecyltrichlorosilane, 1H,1H,2H,2H-tetrahydroperfluorodecyltriisocyanatosilane, 1-heptafluoroisopropoxypropyltrimethoxysilane, 1-heptafluoroisopropoxypropyltriethoxysilane, 1-heptafluoroisopropoxypropyltripropoxysilane, 1-heptafluoroisopropoxypropyltrichlorosilane, 1-heptafluoroisopropoxypropyltriisocyanatosilane, 1,4-bis(trimethoxysilyl)-2,2,3,3-tetrafluorobutane, 1,5-bis(trimethoxysilyl)-2,2,3,3,4,4-hexafluoropentane, etc. Among them, 1H,1H,2H,2H-terahydroperfluorodecyltriethoxysilane is preferred from the viewpoint of refractive index, reactivity, and solubility in solvents.

The silane compounds and fluoroalkylsilane compounds having 4 hydrolyzable groups in the molecule are used preferably in admixture in order to balance the refractive index and film strength of the low refractive index layer. The mixing ratio on this occasion depends on the kind of silane compound and therefore is not particularly fixed. Preferably, they are used in a ratio of 1–500 parts by weight, more preferably 20–300 parts by weight, of the fluoroalkylsilane compound per 100 parts by weight of the silane compound having 4 hydrolyzable groups in the molecule.

In the present invention, specified cure promoting component, i.e., any one of phosphoric acids, sulfonic acids and silicon dioxide flux or mixtures thereof are added to the silane compound to improve the anti-scratching property of the cured film.

Any phosphoric acid such as orthophosphoric acid, metaphosphoric acid or polyphosphoric acid may be used. However, orthophosphoric acid or metaphosphoric acid is preferred. In particular, phosphoric acid (orthophosphoric acid) commercially available usually as a 70–90% aqueous solutions is used advantageously. This is used as it is without isolation.

Phosphoric acid may be formed in the reaction system by addition of water to anhydrous phosphoric acid (diphosphorus pentoxide).

Phosphoric acids can present acidity when added to paints so that they can stabilize the hydrolyzed silane compounds.

Various sulfonic acids may be employed as far as they are soluble in solvents. For example, mention may be made of benzenesulfonic acid, paratoluenesulfonic acid, trifluoroparatoluenesulfonic acid, methanesulfonic acid, trifluoromethanesulfonic acid, ethanesulfonic acid, propanesulfonic acid, 1-naphthylsulfonic acid, 2-naphthylsulfonic acid, etc. Among them, benzenesulfonic acid and paratoluenesulfonic acid are preferred.

The silicon dioxide flux is not particularly limited as far as it is one that is used as a flux for silicon dioxide glass. To form paints, it must be soluble in polar solvents having a boiling point of 50–150° C. in amounts of at least 0.01%.

The silicon dioxide flux includes sodium nitrate, potassium nitrate, potassium sulfate, sodium sulfate, fluorosilicic acid, potassium hexafluorosilicate, sodium hexafluorosilicate, lithium hexafluorosilicate, tetrafluoroboric acid, potassium tetrafluoroborate, sodium tetrafluoroborate, lithium tetrafluoroborate, sodium fluoride, sodium chloride, etc. However, it is not limited thereto.

The silicon dioxide flux that presents acidity is more preferred since it can stabilize the hydrolyzed silane compounds.

Addition of the silicon dioxide flux of 1% to plate-like or block-like glass decreases the melting point by only several degrees (° C.) to several tens degrees (° C.). However, the addition to an outermost surface layer that is 1 µm or less thick, such as the low refractive index layer of the present invention, gives a much greater influence such that minute defects can be leveled by melting by low temperature heating as low as 100° C. As a result, the anti-scratching property is improved considerably.

The strength of film obtained by the addition of phosphoric acids, sulfonic acids or silicon dioxide flux is by far higher than that obtained by the addition of hydrochloric acid, maleic acid, trisacetylaceotnatoaluminum (III) complex or the like usually used in curing silane compounds.

The mechanism in which the phosphoric acids, sulfonic acids or silicon dioxide flux acts has not been elucidated yet. It is presumed that not only it has the effect of promoting three-dimensional crosslinking as an acid but also it enters the crosslinked structure of the cured product to exhibit the effect of relaxation of stress to thereby increase the film strength.

The cure-promoting component is used in an additional amount in the range of 1–30 parts by weight per 100 parts by weight of the hydrolyzable silane compound and/or hydrolyzed product thereof as a main component. If the additional amount is less than 1 part by weight, the effect of improvement of film strength cannot be obtained sufficiently. If it is more than 30 parts by weight, the degree of crosslinking of the cured product decreases too much and the film strength decreases. The range of 5–25 parts by weight is more preferred.

The cure-promoting component after mixing with the silane compound can be coated directly to form a film. Alternatively, it may be coated to form a film after preliminarily adding water thereto in order to hydrolyze it and then, adding the cure-promoting component. In this case, after preparing a silane compound-water-solvent mixture or a mixture further containing a minute amount of a strong acid (hydrochloric acid or the like), the mixture is left to stand at room temperature for from several hours to several days and diluted to a concentration suitable for coating, and the cure promoting component is added before it can be coated to form a film. Alternatively, the silane compound may be reacted in the absence of water using a silane polymerization catalyst such as oxalic acid to form an oligomer, to which the cure-promoting component is added and the mixture is coated to form a film. In this case, the reaction is performed by heating the silane compound-solvent-carboxylic acid catalyst mixture at temperatures in the range of from room temperature to 100° C. and the product is diluted and mixed with the cure promoting component before it can be used in the same manner as in the other cases.

The transparent substrate for the low reflection member of the present invention includes, for example, glass, plastic films, plastic plates, etc. When in use for the surface of LCD or CRT, it is preferably a film in view of productivity, cost, and weight. Specific examples thereof include various films, e.g., polyethylene terephthalate (PET, refractive index n=1.65), triacetylcellulose (TAC, n=1.50), polycarbonate (PC, n=1.58), polystyrene (n=1.60), polyvinyl chloride (n=1.53), cellophane, polyethylene, polypropylene, etc. Among them, PET, TAC and PC are used advantageously. More transparent substrates are more preferred. Specifically, it is preferred that the transparent substrate has a light transmittance of 80% or higher, more preferably 90% or higher. The thickness of the transparent substrate is as thin as possible in view of a reduction in weight. However, taking productivity into consideration, a thickness in the range of 10 to 200 μm is preferred in the case of films.

The light transmittance is measured according to the Japanese Industrial Standards (JIS) K-6714. More particularly, the first five test pieces of about 13 mm in width and about 40 mm in length are prepared. Then, using air as a standard, 100% light transmittance is calibrated. Thereafter, light beams of 450 nm, 550 nm and 650 nm in wavelength are transmitted through each test piece, spectral transmittances are recorded and an average value of maximum transmittances of respective test pieces is defined as light transmittance.

The transparent substrate may be subjected to surface treatment such as corona treatment, plasma treatment, or sputtering treatment or coated with a surface active agent, a silane coupling agent or the like to improve the wettability of the paint which forms the low refractive index layer of the present invention and after curing, adhesion thereof to the low refractive index layer.

The low reflection member of the present invention can be fabricated by the following processes of paint preparation, coating, drying, polymerization and curing.

The paint can be prepared by dissolving the above-described silane compound in any solvent, optionally hydrolyzing or converting into oligomer, and mixing it with the above-described cure promoting component. In this case, to obtain a desired film thickness, the concentration of the silane compound is adjusted to usually 0.1–50% by weight, preferably 0.5–30% by weight. The solvent must contain a polar solvent that can dissolve at least hydrolyzed silane compounds. Solvents having a boiling point of 50–150° C. are used in view of their volatility when the coating is dried. As such solvents there can be used monohydric or polyhydric alcohols such as methanol, ethanol, 1-propanol, 2-propanol, butanol, ethylene glycol, ethylene glycol monomethyl ether, and ethylene glycol monoethyl ether, ketones such as acetone, methyl ethyl ketone and methyl isobutyl ketone, esters such as methyl acetate, ethyl acetate, propyl acetate, and butyl acetate, halogenated hydrocarbons such as chloroform, methylene chloride, and trichloroethylene, etc. However, the present invention is not limited thereto. The above-described solvents may be used alone or as mixtures.

Using the above-prepared paint, a low refractive index layer can be provided on one or both surfaces of the transparent substrate by coating or printing techniques. More particularly, mention may be made of coating techniques such as air doctor coating, blade coating, wire doctor coating, knife coating, reverse coating, transfer roll coating, gravure roll coating, microgravure coating, kiss coating, cast coating, spray coating, slot orifice coating, calender coating, electrodeposition coating, dip coating, and die coating, printing techniques, e.g., letterpress printing such as flexo printing, intaglio printing such as direct gravure printing or offset gravure printing, lithography such as offset printing, stencil printing such as screen printing, etc.

The thickness of the low refractive index layer formed as described above may be determined appropriately taking into consideration the relationship between the refractive index and the wavelength such that the above-described equations (1) and (2) can be satisfied. It is not particularly limited but approximately 100 nm is preferable.

The drying, polymerization, and curing of the film are performed by evaporating the solvent by heat drying and curing by further continuing the heating. The heating is performed at temperatures of 40° C. or higher, preferably 80–120° C. The upper limit of the heating temperature may vary depending on the substrate used. General transparent films cannot be used since they are softened at 120° C. or higher. A so-called sol-gel method, which is a method for curing usual silane compounds, is difficult to apply to plastic substrates since it performs heating usually at 300° C. or higher. Among examples where conventional sol-gel methods are applied to plastic substrates, those examples in which several hours' heating at 120° C. or so have been known. However, in actuality, the coating is used in a semi-cured state so that it has insufficient anti-scratching property. Furthermore, prolonged heating results in poor productivity. However, the method in which the cure-promoting component of the present invention is added curing occurs sufficiently even at 40° C.

The heat source used in this case includes an electric heater, a burner, induction heating, etc. In particular, air heating using an electric heater is used advantageously.

In the present invention, the low refractive index layer may be formed on the transparent substrate directly. However, to decrease reflectance furthermore, a high refractive index layer may be interposed between them. In the case where a high refractive index layer is provided, it is provided on the surface of the transparent substrate directly or through an adhesive layer or the like. To prepare the high refractive index layer by solvent coating, the preparation may be performed by using a binder resin having a high refractive index, by adding ultrafine particles having a high refractive index to the binder resin, or by using both of them. It may be prepared by a vacuum film forming method such as sputtering a substance having a high refractive index. The refractive index of the high refractive index layer is higher than that of the transparent substrate and is preferably in the range of 1.50–2.30. To decrease the reflectance considerably, the refractive index is preferably 1.60–2.30. However, it is not particularly limited to this range. When the refractive index of the high refractive index layer is lower than that of the transparent substrate or outside the above-described range, the effect of anti-reflection is deteriorated.

As materials that constitutes such a high refractive index layer, for example, "KZ-7886B" (refractive index n=1.65) and "KZ-7886C" (refractive index n=1.65) commercially available from JSR Corporation can be used preferably. Dipentaerythritol hexaacrylate (DPHA, refractive index n=1.51) is not so high in refractive index but has high anti-scratching property and is preferred.

In the case where modification of binder resin to have a higher refractive index is to be performed without using any commercially available high refractive index layer forming material, such modification for obtaining higher refractive index can be achieved by the introduction of an aromatic ring, a halogen group other than fluorine, sulfur or the like. Specific examples of the resin having a high refractive index include polystyrene, poly(o-chlorostyrene), poly(2,6-dichlorostyrene), poly(bromostyrene), poly(2,6-dibromostyrene), polycarbonate, aromatic polyesters, polysulfone, polyether sulfone, polyaryl sulfone, poly(pentabromophenyl methacrylate), phenoxy resins, and bromides thereof, epoxy resins and bromides thereof, etc.

The ultrafine particles having a high refractive index include ultrafine particles of, for example, ZnO (refractive index n=1.9), $TiO_2$ (n=2.3), or $CeO_2$ (n=1.95) and incorporation of such imparts the effect of shielding ultraviolet rays to protect displays from deterioration. Incorporation of fine particles of antimony-doped $SnO_2$ (n=1.95) or ITO (n=1.95) imparts antistatic effects so that not only a high refractive index is obtained but also attachment of dust can be prevented. The fine particles may be used alone or as mixtures. Their particle size is preferably 1–100 nm. In order not to deteriorate transparence of the film, it is preferably 5–20 nm.

For the purpose of improving the anti-scratching property of the low reflection member, a so-called hard-coat material may be used for the high refractive index layer. As the hard-coat material, a polyfunctional acrylate such as, for example, DPE-6A, PE-3A, or PE-4A (Kyoeisha Kagaku), to which a photopolymerization initiator such as Darocure 1173 or Irgacure 184 (Ciba Specialty Chemicals) is added is advantageous.

Furthermore, for the purpose of preventing sticking of dust, an antistatic agent may be added to the high refractive index layer. As the antistatic agent, various organic or inorganic conductive materials may be used appropriately. Mention may be made of, for example, fine particles or whiskers of metal such as aluminum or tin, fine particles or whiskers of metal oxide such as tin oxide or titanium oxide doped with antimony or the like, charge transfer complex formed from 7,7,8,8-tetracyanoquinodimethane or the like and an electron donor such as metal ion or organic cation and converted into a filler, a cation-modified silicon compound such as N-trimethoxysilylpropyl-N,N,N-trimethylammonium chloride or octadecyldimethyl[3-(trimethoxysilyl)propyl]ammonium chloride, etc.

Furthermore, for the purpose of preventing glare on the display, an anti-glare layer made of the hard-coat material containing filler, etc. may be formed on the low reflection member of the present invention.

When in use in image display devices such as LCD, PDP, CRT, and EL, the low reflection member of the present invention may be applied to a surface of the image displaying portion of the device through an adhesive or sticky. For example, in the case of LCD, as shown in FIG. 1, polarizing plates 18 are provided such that they sandwich therebetween a TFT substrate 22 provided with a thin film transistor, liquid crystal or the like and a color filter 20. Also, the low reflection member of the present invention may be provided on the LCD by deeming one (outer one) of the polarizing plate 18 as the transparent substrate and laminating a low refractive index layer 10 thereon. Note that in the example shown in FIG. 1, the polarizing plates 18 are constituted by a polarizer 16 made of a polyvinyl alcohol film which has adsorbed thereon dichroic element (iodine, dyestuff, etc.) monoaxially stretched on both surfaces of which is provided a triacetylcellulose film 14 is laminated. An anti-glare layer 12 is interposed between the triacetylcellulose film 14 and the low refractive index layer 10. LCD of such a structure can prevent the reflection of external light and be free of glare so that predetermined image can be observed clearly by the light from a back-light 24.

In the case where it is used in PDP, the low reflection member of the present invention can be applied as an anti-reflection film on the surface of the PDP.

EXAMPLES

<Preparation of a High Refractive Index Layer-1>

DPE-6A (6-functional acrylate; dipentaerythritol hexaacrylate, manufactured by Shin Nakamura Kagaku) containing 5% of Darocure 1173 (cleaving type photo initiator; manufactured by Ciba Specialties Chemicals) was coated to a thickness of 3 µm on a triacetylcellulose film (Fuji TAC UVD-80) of 80 µm thick and irradiated with ultraviolet rays at an irradiation distance of 10 cm at a treatment speed of 5 m/minute using a condenser-type high pressure mercury lamp at a power having an output power of 120 W/cm to polymerize and cure the resulting film.

<Preparation of a High Refractive Index Layer-2>

KZ-7886C (high refractive index hard-coat material, manufactured by JSR Corporation) was coated to a thickness of 2 µm on a triacetylcellulose film (Fuji TAC UVD-80) of 80 µm thick and irradiated with ultraviolet rays at an irradiation distance of 10 cm at a treatment speed of 5 m/minute using a condenser-type high pressure mercury lamp at a power having an output power of 120 W/cm to polymerize and cure the resulting film.

Example 1

Preparation of paint: In a 100-ml three-neck flask equipped with a mechanical stirrer and a reflux condenser, 15 g of tetraethoxysilane, 4 g of distilled water, 4 g of methanol, and one drop (about 0.05 ml) of concentrated hydrochloric acid were charged and stirred at 70° C. for 30 minutes. After cooling the resulting mixture to room temperature, it was diluted with predetermined methanol until 1 wt % (expressed as $SiO_2$) was reached and orthophosphoric acid was added to a concentration of 0.1 wt % based on the solution. The solution contained 5 parts by weight of orthophosphoric acid per 100 parts by weight of tetraethoxysilane.

Film formation: The paint was coated on the high refractive index layer prepared in Preparation of a high refractive index layer-1above by a microgravure coating method and heat-cured at 100° C. for 1 hour using a circulating air drier.

Example 2

Preparation of paint: Two (2) grams of dimethoxysiloxane oligomer ("MKC Silicate MS-51", manufactured by Mitsubishi Chemical) was dissolved in 98 g of isopropyl alcohol. Hundred (100) milligrams of orthophosphoric acid (85%) was added to the resulting solution, which then was left to stand at room temperature for 12 hours to prepare a paint. The paint contained 5 parts by weight of orthophosphoric acid per 100 parts by weight of MS-51.

Film formation: The paint was coated on the high refractive index layer prepared in Preparation of a high refractive index layer-1 above by a microgravure coating method and heat-cured at 100° C. for 1hour using a circulating air drier.

Example 3

Preparation of paint: Four (4) grams of methanol and 4 g of distilled water were added to 15 g of MKC Silicate MS-51 (manufactured by Mitsubishi Chemical) and the mixture was heated at 70° C. for 30 minutes under reflux. The mixture was diluted with a 0.2% isopropyl alcohol solution of orthophosphoric acid to 32.6 fold to prepare a paint. The paint contained 10 parts by weight of orthophosphoric acid per 100 parts by weight of MS-51.

Film formation: The paint was coated on the high refractive index layer prepared in Preparation of a high refractive index layer-1 above by a microgravure coating method and heat-cured at 100° C. for 1 hour using a circulating air drier.

Example 4

Preparation of paint: In a 100-ml three-neck flask, 2.40 g of oxalic acid was dissolved in 14.16 g of ethanol and the mixture was refluxed in an oil bath. A mixture of 2.20 g (10.7 mmol) of tetraethoxysilane and 1.24 g (2.7 mmol) of 1H,1H, 2H,2H-tetrahydroperfluorodecyltriethoxysilane was dripped over 30 minutes. The resulting mixture was further refluxed for 5 hours for complete hydrolysis. The hydrolyzed product was diluted with a 0.2% isopropyl alcohol solution of orthophosphoric acid to 8.26 fold to prepare a paint. The paint contained 10 parts by weight of orthophosphoric acid per 100 parts by weight of the sum of the hydrolyzable silanes.

Film formation: The paint was coated on the high refractive index layer prepared in Preparation of a high refractive index layer-1 above by a microgravure coating method and heat-cured at 100° C. for 1 hour using a circulating air drier.

Example 5

A low reflectance member was prepared in the same manner as in Example 4 except that mixture of 2.20 g (10.7 mmol) of tetraethoxysilane and 1.24 g (2.7 mmol) of 1H,1H, 2H,2H-tetrahydroperfluorodecyltriethoxysilane in Example 4 was replaced by a mixture of 1.31 g of MKC Silicate MS-51 (dimethoxysiloxane oligomer; manufactured by Mitsubishi Chemical) and 1.24 g (6.3 mmol) of 1,1,1-trifluoropropyltriethoxysilane. The paint contained 12 parts by weight of orthophosphoric acid per 100 parts by weight of the sum of the hydrolyzable silanes.

Example 6

A low reflectance member was formed in the same manner as in Example 4 except that the 0.2% isopropyl alcohol solution of orthophosphoric acid in Example 4 was replaced by a 0.2% isopropyl alcohol solution of metaphosphoric acid.

Example 7

A low reflectance member was formed in the same manner as in Example 4 except that the 0.2% isopropyl alcohol solution of orthophosphoric acid in Example 4 was replaced by a 0.2% isopropyl alcohol solution of sodium tetrafluoroborate.

Example 8

A low reflectance member was formed in the same manner as in Example 4 except that the 0.2% isopropyl alcohol solution of orthophosphoric acid in Example 4 was replaced by a 0.2% isopropyl alcohol solution of sodium hexafluorosilicate.

Example 9

A low reflectance member was formed in the same manner as in Example 4 except that the substrate to be coated in Example 4 was replaced by the high refractive index layer prepared in Preparation of a high refractive index layer-2 above.

Example 10

Preparation of paint: In a 100-ml three-neck flask equipped with a mechanical stirrer and a reflux condenser, 15 g of tetraethoxysilane, 4 g of distilled water, 4 g of methanol, and one drop (about 0.05 ml) of concentrated hydrochloric acid were charged and stirred at 70° C. for 30 minutes. After cooling the resulting mixture to room temperature, it was diluted with predetermined methanol until 1 wt % (expressed as $SiO_2$) was reached and benzenesulfonic acid was added to a concentration of 0.1 wt % based on the solution. The solution contained 5 parts by weight of benzenesulfonic acid per 100 parts by weight of tetraethoxysilane.

Film formation: The paint was coated on the high refractive index layer prepared in Preparation of a high refractive index layer-1 above by a microgravure coating method and heat-cured at 100° C. for 1 using a circulating air drier.

Example 11

Preparation of paint: Two (2) grams of dimethoxysiloxane oligomer ("MKC Silicate MS-51", manufactured by Mitsubishi Chemical) was dissolved in 98 g of isopropyl alcohol. Hundred (100) milligrams of paratoluenesulfonic acid was added to the resulting solution, which then was left to stand at room temperature for 12 hours to prepare a paint. The paint contained 5 parts by weight of paratoluenesulfonic acid per 100 parts by weight of MS-51.

Film formation: The paint was coated on the high refractive index layer prepared in Preparation of a high refractive index layer-1 above by a microgravure coating method and heat-cured at 100° C. for 1 using a circulating air drier.

Example 12

Preparation of paint: Four (4) grams of methanol and 4 g of distilled water were added to 15 g of MKC Silicate MS-51 (manufactured by Mitsubishi Chemical) and the mixture was heated at 70° C. for 30 minutes under reflux. The mixture was diluted with a 0.2% isopropyl alcohol solution of paratoluenesulfonic acid to 32.6 fold to prepare a paint. The paint contained 10 parts by weight of paratoluenesulfonic acid per 100 parts by weight of MS-51.

Film formation: The paint was coated on the high refractive index layer prepared in Preparation of a high refractive index layer-1 above by a microgravure coating method and heat-cured at 100° C. for 1 hour using a circulating air drier.

Example 13

Preparation of paint: In a 100-ml three-neck flask, 2.40 g of oxalic acid was dissolved in 14.16 g of ethanol and the mixture was refluxed in an oil bath. A mixture of 2.20 g (10.7 mmol) of tetraethoxysilane and 1.24 g (2.7 mmol) of 1H,1H, 2H,2H-tetrahydroperfluorodecyltriethoxysilane was dripped over 30 minutes. The resulting mixture was further refluxed for 5 hours for complete hydrolysis. The hydrolyzed product was diluted with a 0.2% isopropyl alcohol solution of paratoluenesulfonic acid to 8.26 fold to prepare a paint. The paint contained 10 parts by weight of paratoluenesulfonic acid per 100 parts by weight of the sum of the hydrolyzable silanes. Film formation: The paint was coated on the high refractive index layer prepared in Preparation of a high refractive index layer-1 above by a microgravure coating method and heat-cured at 100° C. for 1 hour using a circulating air drier.

Example 14

A low reflectance member was prepared in the same manner as in Example 13 except that mixture of 2.20 g (10.7 mmol) of tetraethoxysilane and 1.24 g (2.7 mmol) of 1H,1H, 2H,2H-tetrahydroperfluorodecyltriethoxysilane in Example 13 was replaced by a mixture of 1.31 g of MKC Silicate MS-51 (dimethoxysiloxane oligomer; manufactured by Mitsubishi Chemical) and 1.24 g (6.3 mmol) of 1,1,1-trifluoropropyltriethoxysilane. The paint contained 12 parts by weight of paratoluenesulfonic acid per 100 parts by weight of the sum of the hydrolyzable silanes.

Example 15

A low reflectance member was formed in the same manner as in Example 13 except that the 0.2% isopropyl alcohol solution of paratoluenesulfonic acid in Example 13 was replaced by a 0.2% isopropyl alcohol solution of dodecylbenzenesulfonic acid.

Example 16

A low reflectance member was formed in the same manner as in Example 13 except that the 0.2% isopropyl alcohol solution of paratoluenesulfonic acid in Example 13 was replaced by a 0.2% isopropyl alcohol solution of diisopropylnaphthalenesulfonic acid.

Example 17

A low reflectance member was formed in the same manner as in Example 13 except that the substrate to be coated in Example 13 was replaced by the high refractive index layer prepared in Preparation of a high refractive index layer-2 above.

Comparative Example 1

A low reflectance member was formed in the same manner as in Example 4 except that the 0.2% isopropyl alcohol solution of orthophosphoric acid in Example 4 was replaced by isopropyl alcohol alone.

Comparative Example 2

A low reflectance member was formed in the same manner as in Example 3 except that the orthophosphoric acid in Example 3 was replaced by hydrochloric acid.

Comparative Example 3

A low reflectance member was formed in the same manner as in Example 4 except that the 0.2% isopropyl alcohol solution of orthophosphoric acid in Example 4 was replaced by a 0.2% isopropyl alcohol solution of hydrochloric acid.

Comparative Example 4

A low reflectance member was formed in the same manner as in Example 4 except that the 0.2% isopropyl alcohol solution of orthophosphoric acid in Example 4 was replaced by a 0.2% isopropyl alcohol solution of maleic acid.

Comparative Example 5

A low reflectance member was formed in the same manner as in Example 4 except that the 0.2% isopropyl alcohol solution of orthophosphoric acid in Example 4 was replaced by a 0.2% isopropyl alcohol solution of trisacetylacetonatoaluminum (III) complex.

Comparative Example 6

A low reflectance member was formed in the same manner as in Example 11 except that the paratoluenesulfonic acid in Example 11 was replaced by hydrochloric acid.

Evaluation Method

The low reflection members prepared in Examples 1–17 and Comparative Examples 1–6 were evaluated on the following properties.

(1) Spectral reflectance: Reflectance at 550 nm was measured using a spectrophotometer equipped with a 5° regular reflection measuring apparatus (UV-3100; manufactured by Shimadzu Seisakusho). The coated surface was used as a measurement surface and the opposite surface was roughened with steel wool and colored with black ink in order to prevent reflection.

(2) Anti-scratching property: The surface opposite to the coated surface was roughened with steel wool and colored with black ink. The coated surface was rubbed with fingers strongly about 20 times and the fingerprint fat attached to the surface was removed with tissue paper. Differences in appearance between the rubbed portion and peripheral portion were visually observed. The sample of which any difference in appearance was observed was indicated by a symbol × and the sample of which no difference in appearance was observed was indicated by a symbol ○.

(3) Resistance to steel wool roughening: A 1 cm×1 cm piece of steel wool (#0000) was attached to a pencil hardness tester and the coated surface was rubbed therewith by 5 strokes under a load of 250g/cm$^2$. After removing the dust, marks formed were visually observed. Those samples having 4 or more marks were indicated by a symbol ×, those samples having 1–3 marks were indicated by a symbol Δ, and those samples having no mark at all were indicated by a symbol ○.

TABLE 1

| | Silane compound | Cure-promoting component | High refractive index layer | Hydrolysis method | Spectral reflectance (%) | Anti-scratching | Anti-steel wool roughening |
|---|---|---|---|---|---|---|---|
| Example 1 | TEOS | Orthophosphoric acid | 1 | (III) | 2.30 | ○ | ○ |
| Example 2 | MS-51 | Orthophosphoric acid | 1 | (I) | 2.25 | ○ | ○ |
| Example 3 | MS-51 | Orthophosphoric acid | 1 | (II) | 2.23 | ○ | ○ |
| Example 4 | TEOS:C8Si | Orthophosphoric acid | 1 | (IV) | 1.75 | ○ | ○ |
| Example 5 | MS-51:C1Si | Orthophosphoric acid | 1 | (IV) | 1.90 | ○ | Δ |
| Example 6 | TEOS:C8Si | Metaphosphoric acid | 1 | (IV) | 1.71 | ○ | Δ |
| Example 7 | TEOS:C8Si | Sodium tetrafluoroborate | 1 | (IV) | 1.65 | ○ | Δ |
| Example 8 | TEOS:C8Si | Sodium hexafluorosilicate | 1 | (IV) | 1.68 | ○ | ○ |
| Example 9 | TEOS:C8Si | Orthophosphoric acid | 2 | (IV) | 0.90 | ○ | ○ |
| Comparative Example 1 | TEOS:C8Si | None | 1 | (IV) | 1.70 | X | X |
| Comparative Example 2 | MS-51 | Hydrochloric acid | 1 | (II) | 2.50 | X | X |

TABLE 1-continued

| | Silane compound | Cure-promoting component | High refractive index layer | Hydrolysis method | Spectral reflectance (%) | Anti-scratching | Anti-steel wool roughening |
|---|---|---|---|---|---|---|---|
| Comparative Example 3 | TEOS:C8Si | Hydrochloric acid | 1 | (IV) | 1.76 | X | X |
| Comparative Example 4 | TEOS:C8Si | Maleic acid | 1 | (IV) | 1.72 | X | X |
| Comparative Example 5 | TEOS:C8Si | Trisacetyl-acetonatoaluminum (III) | 1 | (IV) | 1.80 | X | X |

TABLE 2

| | Silane compound | Cure-promoting component | High refractive index layer | Hydrolysis method | Spectral reflectance (%) | Anti-scratching | Anti-steel wool roughening |
|---|---|---|---|---|---|---|---|
| Example 10 | TEOS | Benzenesulfonic acid | 1 | (III) | 2.28 | ○ | ○ |
| Example 11 | MS-51 | Paratoluenesulfonic acid | 1 | (I) | 2.40 | ○ | ○ |
| Example 12 | MS-51 | Paratoluenesulfonic acid | 1 | (II) | 2.23 | ○ | ○ |
| Example 13 | TEOS:C8Si | Paratoluenesulfonic acid | 1 | (IV) | 1.72 | ○ | ○ |
| Example 14 | MS-51:C1Si | Paratoluenesulfonic acid | 1 | (IV) | 1.91 | ○ | Δ |
| Example 15 | TEOS:C8Si | Dodecylbenzene-sulfonic acid | 1 | (IV) | 1.70 | ○ | Δ |
| Example 16 | TEOS:C8Si | Diisopropyl-naphthalene-sulfonic acid | 1 | (IV) | 1.78 | ○ | Δ |
| Example 17 | TEOS:C8Si | Paratoluenesulfonic acid | 2 | (IV) | 0.92 | ○ | ○ |
| Comparative Example 6 | MS-51 | Hydrochloric acid | 1 | (I) | 2.50 | X | X |

In the tables above, the silane compounds used are as follows.

| TEOS; | Tetraethoxysilane |
| MS-51; | Dimethoxysiloxane oligomer |
| C8Si; | 1H,1H,2H,2H-Tetrahydroperfluorodecyltriethoxy-silane |
| C1Si; | 1,1,1-Trifluoropropyltriethoxysilane |

The high refractive index layer 1 contained DPE-6A and the high refractive index layer 2 contained KZ-7886C.
The hydrolysis method was as follows:

| (I); | No hydrolysis |
| (II); | Heated with distilled water |
| (III); | Heated with hydrochloric acid |
| (IV); | Heated with oxalic acid |

The results of evaluation as shown in Tables 1 and 2 revealed that the low reflection member of examples each exhibited good anti-reflection property and had excellent anti-scratching property and resistance to anti-steel wool property. On the other hand, Comparative Examples were poor in both the anti-scratching property and anti-steel wool property.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A low reflection member comprising:
    a transparent substrate and a low refractive index layer having a refractive index lower than that of the transparent substrate,
    wherein the low refractive index layer comprises a cured product of a mixture consisting essentially of a silane having 4 hydrolyzable groups and a cure promoting component composed of at least one selected from phosphoric acids, sulfonic acids, and silicon dioxide flux,
    wherein the silane compound having 4 hydrolyzable groups is represented by the following formula [1]

$$R^1{}_a\text{—}SiX_{4-a} \quad a=0 \qquad [1]$$

wherein: X represents any one of Cl, Br, NCO, and OR$^4$; and R$^1$ and R$^4$ each represent an organic group having 1–20 carbon atoms.

2. The low reflection member according to claim 1, wherein the low refractive index layer is a cured product of a mixture containing 1–30 parts by weight of the cure promoting component per 100 parts by weight of the silane compound having 4 hydrolyzable groups.

3. The low reflection member according to claim 2, wherein the phosphoric acid is orthophosphoric acid or metaphosphoric acid.

4. The low reflection member according to claim 2, wherein the sulfonic acid is benzenesulfonic acid or para-toluenesulfonic acid.

5. The low reflection member according to claim 2, further comprising a high refractive index layer between the low refractive index layer and the transparent substrate.

6. The low reflection member according to claim 2, wherein the transparent substrate is polarizing plate.

7. The low reflection member according to claim 1, wherein the phosphoric acid is orthophosphoric acid or metaphosphoric acid.

8. The low reflection member according to claim 1, wherein the sulfonic acid is benzenesulfonic acid or para-toluenesulfonic acid.

9. The low reflection member according to claim 1, further comprising a high refractive index layer between the low refractive index layer and the transparent substrate.

10. The low reflection member according to claim 1, wherein the transparent substrate is polarizing plate.

11. A low reflection member comprising:
   a transparent substrate and a low refractive index layer having a refractive index lower than that of the transparent substrate,
   wherein the low refractive index layer comprises a cured product of a mixture consisting essentially of a silane having 4 hydrolyzable groups, a fluoroalkylsilane compound, and a cure promoting component composed of at least one selected from phosphoric acids, sulfonic acids, and silicon dioxide flux,
   wherein the silane compound having 4 hydrolyzable groups is represented by the following formula [1]

$$R^1{}_a\text{—SiX}_{4-a} \quad a=0 \qquad [1]$$

wherein: X represents any one of Cl, Br, NCO, and $OR^4$; and $R^1$ and $R^4$ each represent an organic group having 1–20 carbon atoms,
   wherein the fluoroalkylsilane compound is a fluoroalkylsilane compound represented by formula [4] and/or a fluoroalkylsilane compound represented by formula [5]

$$R^5{}_a\text{—SiX}_{4-a} \quad 1 \leq a \leq 2 \qquad [4]$$

$$X_3\text{Si—}R^6\text{—SiX}_3 \qquad [5]$$

wherein X represents any one of CL, Br, NCO, and $OR^4$; $R^5$ and $R^6$ represent each an organic group having at least one fluorine atom, and $R^4$ is as defined above.

12. The low reflection member according to claim 11, wherein the phosphoric acid is orthophosphoric acid or metaphosphoric acid.

13. The low reflection member according to claim 11, wherein the sulfonic acid is benzenesulfonic acid or para-toluenesulfonic acid.

14. The low reflection member according to claim 11, further comprising a high refractive index layer between the low refractive index layer and the transparent substrate.

15. The low reflection member according to claim 11, wherein the transparent substrate is polarizing plate.

16. The low reflection member according to claim 3, wherein the low refractive index layer is a cured product of a mixture containing 1–30 parts by weight of the cure promoting component per 100 parts by weight of the silane compound having 4 hydrolyzable groups.

17. The low reflection member according to claim 3, wherein the mixing ratio between the silane compound having 4 hydrolyzable groups and the fluoroalkylsilane compound is 10 parts by weight: 20–300 parts by weight.

* * * * *